United States Patent Office 2,858,322
Patented Oct. 28, 1958

2,858,322
PROCESS FOR THE PREPARATION OF
3,4-DIHYDRO-1,2-H-PYRANS

Donald G. Kubler and Amelio E. Montagna, South Charleston, W. Va., assignors to Union Carbide Corporation, a corporation of New York No Drawing. Application November 13, 1956
Serial No. 621,498

4 Claims. (Cl. 260—345.1)

This invention relates to an improved process for the preparation of 3,4-dihydro-1,2-H-pyrans. More particularly, the present invention relates to the vapor phase dealcoholation of 2-alkoxytetrahydropyrans.

We have discovered an improved process for the preparation of 3,4-dihydro-1,2-H-pyrans. Our invention comprises an efficient and economical process which can be precisely and easily controlled and from which high yields of a substantially pure product can be obtained.

The present invention is particularly applicable to the reaction which can be represented graphically by the following general equation:

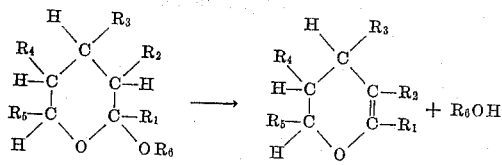

wherein $R_1$, $R_2$, $R_3$, $R_4$ and $R_5$ are radicals selected from the class consisting of hydrogen and alkyl containing from 1 to 4 carbon atoms, inclusive, $R_6$ is an alkyl radical containing from 1 to 10 carbon atoms, inclusive, at least two of said $R_1$ through $R_5$ radicals being hydrogen and the total of said $R_1$ through $R_6$ radicals containing no more than 22 carbon atoms.

In accordance with out invention, a 2-alkoxytetrahydropyran, in the vapor phase, at a temperature of from about 150° C. to about 400° C., and preferably from 275° C. to 375° C., is passed through a reaction zone over a catalyst comprised of a diatomaceous earth having an alkaline reaction. The reaction zone can be maintained at atmospheric, subatmospheric or superatmospheric pressure.

Diatomaceous earth is herein deemed to have an alkaline reaction, when an aqueous extract of the earth at room temperature (100 grams of water to 5 grams of earth) has a pH above 7. Some commercial forms of diatomaceous earth prepared for use as catalyst carriers already have an alkaline reaction, and these materials may be used without further treatment. However, some commercial varieties of diatomaceous earth have an acid reaction, and these types should be treated with an alkaline material before being used as catalysts. Preferably, such acid-reacting diatomaceous earths are treated with a dilute aqueous solution, for instance 2 percent, of an alkali metal or an alkaline earth metal hydroxide, such as potassium, sodium, lithium, calcium or barium hydroxide, and then washed with water to remove the bulk of the added alkaline material. The washing is not carried so far, however, that the treated earth no longer has an alkaline reaction, as above defined.

Although diatomaceous earth catalysts having an acid reaction and catalysts such as silica gel and alumina will catalyze the removal of the 2-alkoxy group from 2-alkoxytetrahydropyrans, these materials are not as effective as diatomaceous catalysts having an alkaline reaction and tend to promote undesirable side reactions.

The contact time for the dealcoholation reaction can be varied from about 1 second to 2 minutes or longer. Preferably, however, the contact time should be from about 5 to about 50 seconds. As used herein, contact time is volume of catalyst per volume of reactant (calculated as a vapor under reaction conditions and assuming the vapor behaves as an ideal gas) per unit time.

The following examples are illustrative.

EXAMPLE I 4-methyl-3,4-dihydro-1,2-H-pyran

On hundred seventy milliliters of a commercial form of diatomaceous earth ("Celite" type 408), in the shape of cylindrical pellets, was treated with a 2 weight percent aqueous solution of sodium hydroxide and dried. The resulting catalyst, which had an alkaline reaction, was placed in a 1-inch (I. D.) Vycor reaction tube 36 inches long, equipped with an insulated, electrically heated jacket. 2-ethoxy-4-methyltetrahydropyran, in the liquid phase, was fed to the tube at the top at the rate of 144 grams per hour. The upper portion of the tube served as a preheater, the temperature being maintained at from about 150° C. to about 250° C. The lower portion of the tube served as the cracking region wherein the temperature varied from about 250° C. to about 375° C. The exit vapors were condensed and the product was washed repeatedly with 0.001 N aqueous sodium hydroxide solution until all the ethanol produced by the reaction had been extracted. The organic layer was then distilled to give 4-methyl-3,4-dihydro-1,2-H-pyran in 92 percent yield having the following properties: B. P.=101.5 to 102.4° C.; $n_D^{20}$=1.4392; sp. gr. 20/15.6=0.8952; M. R. (calcd.) =28.88; M. R. (found)=28.8.

EXAMPLE II 5-ethyl-3,4-dihydro-1,2-H-pyran

In a manner similar to that in Example I, the reaction tube was filled with 200 milliliters of base-treated "Celite" 408 catalyst, similar to that employed in Example I, and 60 ml. of 8 mm. glass Raschig rings were added on top of the catalyst as a vaporizer. The cracking region was heated to from 300° C. to 350° C. and this temperature was maintained for a period of 6 hours and 20 minutes during which time 683 grams of 2-ethoxy-3-ethyltetrahydropyran was passed over the catalyst. The product was distilled and 5-ethyl-3,4-dihydro-1,2-H-pyran was obtained, in 91 percent yield, and having the following physical properties: B. P. 57° C. to 59° C. at 50 mm. $n_D^{20}$=1.4490, sp. gr. 20/15.6=0.904, M. R. (calcd.) =33.50, M. R. (found)=33.25.

EXAMPLE III 3,4-dihydro-1,2-pyran

For the de-ethanolation of 2-ethoxytetrahydropyran, the reactor was a 1-in. by 54 in. stainless steel tube equipped with an insulated electrically heated Dowtherm jacket. The reactor was equipped with a preheater, a mechanical feed pump, a water cooled condenser, and a receiver. The catalyst charge was 400 ml. of base-treated "Celite" 408, similar to that employed in Example I.

With the temperature of the catalyst bed varying from 270° C. to 280° C., 1093 grams of 2-ethoxytetrahydropyran were pumped into the reactor over a period of 3.83 hours. The condensate contained 61.5 percent by weight of 3,4-dihydro-1,2-pyran (95.2 percent yield, on a contained basis) as determined by unsaturation analysis. The product was treated as in Example I to provide 620 grams (87.8 percent yield) of refined 3,4-dihydro-1,2-pyran which distilled at 84–84.5° C. and had an $n_D^{20}$=1.4415.

EXAMPLE IV

3,4-dihydro-1,2-pyran

The reactor and catalyst charge for this example were similar to those used in Example III, above. Using a reaction temperature of 275° C., 201 grams of 2-(2-ethylhexoxy) tetrahydropyran were passed through the reactor during a period of 50 minutes. The condensed reactor effluent was distilled directly to provide 66 grams (84 percent yield) of refined 3,4-dihydro-1,2-pyran having a B. P. of 84° C.–85° C.

We claim:

1. Process for preparing 3,4-dihydro-1,2-H-pyrans which comprises passing a 2-alkoxytetrahydropyran in the vapor phase at a temperature of from 150° C. to 400° C. over a diatomaceous earth catalyst having an alkaline reaction.

2. Process for preparing 3,4-dihydro-1,2-H-pyrans which comprises passing a 2-alkoxytetrahydropyran in the vapor phase at a temperature of from 150° C. to 375° C. over a diatomaceous earth catalyst having an alkaline reaction.

3. Process for preparing 3,4-dihydro-1,2-H-pyrans which comprises passing a 2-alkoxytetrahydropyran having the general formula:

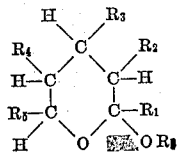

wherein $R_1$, $R_2$, $R_3$, $R_4$ and $R_5$ are radicals selected from the class consisting of hydrogen and alkyl containing from 1 to 4 carbon atoms, inclusive, $R_6$ is an alkyl radical containing from 1 to 10 carbon atoms, inclusive, at least two of said $R_1$ through $R_5$ radicals being hydrogen and the total of said $R_1$ through $R_6$ radicals containing no more than 22 carbon atoms, in the vapor phase at a temperature of from 150° C. to 400° C. over a diatomaceous earth catalyst having an alkaline reaction.

4. Process for preparing 3,4-dihydro-1,2-H-pyrans which comprises passing a 2-alkoxytetrahydropyran having the general formula:

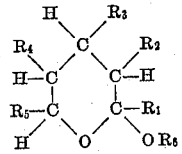

wherein $R_1$, $R_2$, $R_3$, $R_4$ and $R_5$ are radicals selected from the class consisting of hydrogen and alkyl containing from 1 to 4 carbon atoms, inclusive, $R_6$ is an alkyl radical containing from 1 to 10 carbon atoms, inclusive, at least two of said $R_1$ through $R_5$ radicals being hydrogen and the total of said $R_1$ through $R_6$ radicals containing no more than 22 carbon atoms, in the vapor phase at a temperature of from 150° C. to 375° C. over a diatomaceous earth catalyst having an alkaline reaction.

No references cited.